United States Patent
Havilio et al.

(10) Patent No.: US 9,760,187 B2
(45) Date of Patent: Sep. 12, 2017

(54) STYLUS WITH ACTIVE COLOR DISPLAY/SELECT FOR TOUCH SENSITIVE DEVICES

(71) Applicant: BARNES & NOBLE COLLEGE BOOKSELLERS, LLC, Basking Ridge, NJ (US)

(72) Inventors: Amir Mesguich Havilio, Palo Alto, CA (US); Dale J. Brewer, San Marcos, CA (US)

(73) Assignee: BARNES & NOBLE COLLEGE BOOKSELLERS, LLC, Basking Ridge, NJ (US)

( * ) Notice: Subject to any disclaimer, the term of this patent is extended or adjusted under 35 U.S.C. 154(b) by 563 days.

(21) Appl. No.: 13/793,440

(22) Filed: Mar. 11, 2013

(65) Prior Publication Data

US 2014/0253468 A1   Sep. 11, 2014

(51) Int. Cl.
 *G06F 3/0354*   (2013.01)
 *G06F 3/03*   (2006.01)

(52) U.S. Cl.
 CPC ........ *G06F 3/03545* (2013.01); *G06F 3/0317* (2013.01); *G06F 3/0321* (2013.01); *G06F 2203/04106* (2013.01)

(58) Field of Classification Search
 CPC .. G06F 3/03545; G06F 3/0354; G06F 3/0356; G06F 2203/04101; G06F 2203/04108; G06F 3/0317; G06F 3/0321; G06F 2203/04104; G06F 2203/04106
 USPC ..................... 345/173–184; 178/18.01–20.04
 See application file for complete search history.

(56) References Cited

U.S. PATENT DOCUMENTS

| 4,896,543 A | 1/1990 | Gullman |
| 5,633,471 A | 5/1997 | Fukushima |
| 5,844,557 A | 12/1998 | Shively, II |
| 6,259,438 B1 | 7/2001 | Fleck et al. |

(Continued)

FOREIGN PATENT DOCUMENTS

EP   0722150 A1   7/1996

OTHER PUBLICATIONS

"Adonit Jot Touch (for iPad)," Adonit Jot Touch (for iPad) Review & Rating—PCMag.com; http://www.pcmag.com/article2/0,2817,2411192,00.asp; 6pages, printed from the Internet on Jun. 20, 2013.

(Continued)

*Primary Examiner* — Vinh Lam
(74) *Attorney, Agent, or Firm* — Finch & Maloney PLLC

(57) ABSTRACT

Styluses with active color indicator functionality are disclosed. The styluses are intended for use with a touch sensitive device. The active color generally refers to the color currently in use by the touch sensitive device, such as in a virtual drawing or note taking application. Active colors can be selected using the touch sensitive device and/or the stylus itself. When the active color is selected using the touch sensitive device, the stylus receives the active color information and indicates the color on the stylus (e.g., via a correspondingly colored LED or LCD or a color rotation mechanism). When the active color is selected from the stylus itself, that color is indicated on the stylus and active color information is transmitted to the touch sensitive device. The active color can be displayed such that it is detectable regardless of stylus position (e.g., no blind spots).

20 Claims, 6 Drawing Sheets

(56) References Cited

U.S. PATENT DOCUMENTS

| | | | |
|---|---|---|---|
| 6,538,645 B1* | 3/2003 | Juang | G06F 3/0425 178/18.01 |
| 6,681,045 B1* | 1/2004 | Lapstun | B41J 2/17503 178/18.01 |
| 6,956,564 B1 | 10/2005 | Williams | |
| 7,027,038 B2* | 4/2006 | Carro | G06Q 10/10 178/18.01 |
| 7,649,524 B2 | 1/2010 | Haim et al. | |
| 7,840,912 B2 | 11/2010 | Elias et al. | |
| 7,898,541 B2 | 3/2011 | Hong et al. | |
| RE42,738 E | 9/2011 | Williams | |
| 8,059,101 B2 | 11/2011 | Westerman et al. | |
| 8,239,413 B2 | 8/2012 | Hubert | |
| 8,254,605 B2* | 8/2012 | Van Schaack | H04R 1/028 345/179 |
| 8,274,536 B2 | 9/2012 | Chaudhri et al. | |
| 8,286,104 B1 | 10/2012 | Yonge-Mallo | |
| D670,713 S | 11/2012 | Cranfill et al. | |
| RE44,103 E | 3/2013 | Williams | |
| 8,400,417 B2 | 3/2013 | Ording et al. | |
| 8,508,494 B2 | 8/2013 | Moore | |
| 9,285,899 B2* | 3/2016 | Harel | G06F 3/03542 |
| 2001/0025289 A1 | 9/2001 | Jenkins et al. | |
| 2002/0116421 A1 | 8/2002 | Fox et al. | |
| 2003/0178493 A1* | 9/2003 | Njolstad | G06F 3/014 235/472.03 |
| 2007/0047002 A1 | 3/2007 | Hull et al. | |
| 2008/0036747 A1 | 2/2008 | Hope | |
| 2008/0046490 A1* | 2/2008 | Williams | G06F 3/041 708/107 |
| 2009/0115744 A1* | 5/2009 | Zhang | G06F 3/0346 345/179 |
| 2009/0146975 A1* | 6/2009 | Chang | G06F 3/03545 345/179 |
| 2010/0021022 A1* | 1/2010 | Pittel | G06F 3/03545 382/123 |
| 2010/0100854 A1 | 4/2010 | Russell et al. | |
| 2010/0192086 A1 | 7/2010 | Kocienda et al. | |
| 2010/0229130 A1 | 9/2010 | Edge et al. | |
| 2010/0259482 A1 | 10/2010 | Ball | |
| 2010/0262659 A1 | 10/2010 | Christiansen et al. | |
| 2010/0318895 A1 | 12/2010 | Steinberger et al. | |
| 2011/0093819 A1* | 4/2011 | Irvine | G06F 3/038 715/856 |
| 2011/0169756 A1* | 7/2011 | Ogawa | G06F 3/03545 345/173 |
| 2011/0258542 A1 | 10/2011 | Kenney et al. | |
| 2012/0056821 A1 | 3/2012 | Goh | |
| 2012/0127110 A1 | 5/2012 | Amm et al. | |
| 2012/0139879 A1 | 6/2012 | Kim et al. | |
| 2012/0192250 A1* | 7/2012 | Rakan | G06F 3/03545 726/2 |
| 2012/0221938 A1 | 8/2012 | Patterson et al. | |
| 2012/0235901 A1 | 9/2012 | Binder | |
| 2012/0242579 A1 | 9/2012 | Chua | |
| 2012/0242584 A1 | 9/2012 | Tuli | |
| 2012/0249768 A1 | 10/2012 | Binder | |
| 2012/0280947 A1 | 11/2012 | Weaver et al. | |
| 2012/0311438 A1 | 12/2012 | Cranfill et al. | |
| 2012/0329529 A1 | 12/2012 | van der Raadt | |
| 2013/0016045 A1 | 1/2013 | Zhao et al. | |
| 2013/0036383 A1 | 2/2013 | Yuan et al. | |
| 2013/0063364 A1 | 3/2013 | Moore | |
| 2013/0076632 A1 | 3/2013 | Sirpal et al. | |
| 2013/0076637 A1 | 3/2013 | Teltz | |
| 2013/0076638 A1 | 3/2013 | Sirpal et al. | |
| 2013/0076781 A1 | 3/2013 | Sirpal et al. | |
| 2013/0113699 A1 | 5/2013 | Lim | |
| 2013/0120271 A1 | 5/2013 | Lee et al. | |
| 2013/0135234 A1 | 5/2013 | Hisano et al. | |
| 2013/0139078 A1 | 5/2013 | Chuang et al. | |
| 2013/0139107 A1 | 5/2013 | Jung | |
| 2013/0162532 A1 | 6/2013 | Cheng et al. | |
| 2013/0185680 A1 | 7/2013 | Chaudhri et al. | |
| 2013/0194308 A1 | 8/2013 | Privault et al. | |
| 2013/0265269 A1* | 10/2013 | Sharma | G06F 3/0416 345/173 |
| 2013/0314330 A1* | 11/2013 | Peterson | G06F 3/0416 345/173 |
| 2013/0335380 A1* | 12/2013 | Griffin | G06F 3/03545 345/179 |
| 2014/0002422 A1* | 1/2014 | Stern | G06F 3/03545 345/179 |
| 2014/0049513 A1* | 2/2014 | Huang | G06F 3/041 345/174 |
| 2014/0078109 A1* | 3/2014 | Armstrong-Muntner | G06F 3/03542 345/175 |
| 2014/0085269 A1* | 3/2014 | Armstrong-Muntner | G06F 3/03545 345/179 |
| 2014/0104189 A1* | 4/2014 | Marshall | G06F 3/0416 345/173 |
| 2014/0137015 A1* | 5/2014 | Gurtler | G06F 3/03542 715/765 |
| 2014/0168175 A1* | 6/2014 | Mercea | G06F 3/03545 345/179 |
| 2014/0168176 A1* | 6/2014 | Nowatzyk | G06F 3/03545 345/179 |
| 2014/0168177 A1* | 6/2014 | Mkrtchyan | G06F 3/041 345/179 |
| 2014/0210797 A1* | 7/2014 | Kreek | G06F 3/0488 345/179 |
| 2014/0232693 A1* | 8/2014 | Schuckle | G06F 3/0386 345/175 |
| 2014/0258901 A1* | 9/2014 | Cho | G06F 3/04883 715/765 |
| 2014/0333589 A1* | 11/2014 | Wang | G06F 3/03545 345/179 |

OTHER PUBLICATIONS

Volpe, Joseph, Amazon patents intelligent pen for adding annotations to digital and printed media (updated), posted Mar. 6, 2012 at 5:39PM, http://www.engadget.com/2012/03/06/amazon-patents-intelligent-pen/, 3 pages, printed from the Internet on Jun. 20, 2013.

"Apple Secretly Filed Three Dynamic Smart Pen Patents in Europe that are Chock Full of Cool Ideas," http://www.patentlyapple.com/patently-apple/2013/02/apple-secretly-filed-three-dynamic-smart-pen-patents-in-europe-that-are-chock-full-of-cool-ideas.html, originally published Feb. 28, 2013, 13 pages, printed from the Internet on Aug. 13, 2013.

"Bamboo Stylus," Wacom Americas, http://www.wacom.com/en/products/stylus, 5 pages, printed from the Internet on Jun. 20, 2013.

Robertson, Adi, "Blue Tiger pressure-sensitive iOS stylus will work over Bluetooth 4.0," http://www.theverge.com/2012/3/7/2851562/blue-tiger-ten-one-design-pressure-sensitive-bluetooth-4-0-stylus, 1 page, printed from the Internet on Aug. 2, 2013.

Malacria, et al., "Clutch-Free Panning and Integrated Pan-Zoom Control on Touch-Sensitive Surfaces: The CycloStar Approach," CHI 2010, Apr. 10-15, 2010, Atlanta, Georgia, USA. Copyright 2010 ACM 978-1-60558-929-9, 10 pages, Sep. 10, 2004.

"Pen," DuoSense Pen, N-trig Hands-on computing, http://www.n-trig.com/Content.aspx?Page=DigitalPencil, 3 pages, printed from the Internet on Jun. 20, 2013.

"Easing functions," Easing Functions Cheat Sheet, http://easings.net/, 3 pages, printed from the Internet on Jun. 17, 2013.

Kirupa, Easing Functions (aka Timing Functions) in CSS3, printed Apr. 3, 2013, kirupa.com, http://www.kirupa.com/html5/easing_functions_css3.htm, 16 pages, printed from the Internet on Jun. 18, 2013.

"EMR (Electro-Magnetic Resonance) Technology—The De Facto Standard for Pen Tablet Devices is Realized using EMR Technology," Wacom Components : Input Technology : EMR Technology, http://wacom-components.com/english/technology/emr.html, 5 pages, printed from the Internet on Aug. 2, 2013.

(56) References Cited

OTHER PUBLICATIONS

"Simultaneous Pen & Touch: The Natural Way to Work," Perceptive Pixel Active Stylus, www.perceptivepixel.com/_literature_136086/Active_Stylus, 2 pages, printed from the Internet on Dec. 14, 2012.
"Future Apple Notebooks & Tablets may use Acoustic Commands—Patently Apple," originally published Feb. 18, 2011, http://www.patentlyapple.com/patently-apple/2011/02/future-apple-notebooks-tablets-may,6 pages, printed from the Internet on Nov. 3, 2012.
"Guidelines for selecting text and images (Windows Store apps)," http://msdn.microsoft.com/en-us/library/windows/apps/hh465334, 5 pages, printed from the Internet on Jun. 20, 2013.
Lutz, Zachary, "Hands-on with wireless, ultrasonic stylus an touchless gestures at MWC (video)," posted Mar. 1, 2012 at 8:28 AM, http://www.engadget.com/2012/03/01/hands-on-with-wireless-ultrasonic-stylus-and-touchl, 3 pages, printed from the Internet on Jun. 20, 2013.
"HEX3 JaJa Pressure Sensitive Stylus," HEX3 JaJa Pressure Sensitive Stylus Review & Rating—PCMag.com, http://www.pcmag.com/article2/0,2817,2411194,00.asp, 6 pages, printed from the Internet on Jun. 20, 2013.
"How do WACOM tablets work?," tablet4u.co.uk, http://www.tablet4u.co.uk/techinfo.html, 2 pages, printed from the Internet on Jun. 20, 2013.
Kim, Arnold, "Multi-Touch Page Flipping eBook Concept Shown on an iPad," posted Jan. 22, 2012 at 10:52pm PST, MacRumors—news and rumors you care about, http://www.macrumors.com/2012/01/23/multi-touch-page-flipping-ebook-concept-shown—6 pages, printed from the Internet on Nov. 3, 2012.
"Desktop Touchscreens,"—Desktop touchscreens explained, http://www.touchscreenmagazine.nl/touchscreen-solutions/desktop-touchscreens, 1 page, printed from the Internet on Nov. 3, 2012.
"MTStylus Wireless Stereo Stylus for iPhone/Andriod Phone & Tablet," dexim-MTStylus Wireless Stereo Stylus, http://www.dexim.net/content.php?id=165&pid=11, 2 pages, printed from the Internet on Jun. 20, 2013.
"Padblue 2," BRANDO—mobile.brando.com, http://mobile.brando.com/Padblue-2_p9162c1577d94.html., 4 pages, printed from the Internet on May 10, 2013.
Fingas, Jon, "Panasonic mobile devices to use Anoto's pattern-based pen input technology," posted Jan. 8, 2013 at 1:00PM, http://www.engadget.com/2013/01/08/panasonic-mobile-devices-to-use-anoto-pattern-pen-, 4 pages, printed from the Internet on Jun. 20, 2013.
"Bluetooth 4.0 SmartPen the future just got a little brighter," Pogo Connect, http://tenonedesign.com/connect.php, 7 pages, printed from the Internet on Jun. 20, 2013.
Quick, Darren, "Pressure sensitive technology set to bring 3D capability to touchscreens," posted on Jan. 31, 2010, Mobile Technology, http://www.gizmag.com/new-touchscreen-technology, 4 pages, printed from the Internet on Aug. 2, 2013.
Rigg, Jamie, "Sony tries to patent stylus with friction-based haptic feedback," posted on Nov. 22, 2012 at 9:50 AM, http://www.engadget.com/2012/11/22/sony-haptic-feedback-stylus-patent/, 2 pages, printed from the Internet on Jun. 20, 2013.
"Stylus Hanging Bluetooth Headset," BRANDO—mobile.brando.com, http://mobile.brando.com/prod_detail.php?prod_id=03291, 4 pages, printed from the Internet on May 10, 2013.
"The JukeStyle is a great budget stylus for your iOS devices," stylus Archives—iPad News, http://www.ipadnews.nl/tag/stylus/, 44 pages, printed from the Internet on Jun. 20, 2013.
Lavrinc, Damon, "Why Flipping Through Paper-Like Pages Endures in the Digital World," originally posted on May 11, 2012 at 3:48PM, Gadget Lab, http://www.wired.com/gadgetlab/2012/05/why-flipping-through-paper-like-pages-endures-in-the-digital-world/, 5 pages, printed from the Internet on May 6, 2013.
Bragdon, et al., "Experimental Analysis of Touch-Screen Gesture Designs in Mobile Environments", Proceedings of the SIGCHI Conference on Human Factors in Computing Systems, pp. 403-412 (2011).
"Gesture Search for Google Mobile", Google Mobile, www.google.com/mobile/gesture-search, 1 page, printed from the Internet on Dec. 26, 2012.
"Comics by comiXology," Comic Book Reader Guide, http://www.comicbookreaderguide.com/comics-by-comixology/, 24 pages, printed from the Internet on May 6, 2013.
"NFC Forum: Frequently Asked Questions," http://www.nfc-forum.org/resources/faqs#acknowledge, 11 pages, printed from the Internet on Feb. 18, 2013.
"How to Remote Wipe an iPhone or iPad," OSXDaily, http://osxdaily.com/2012/06/05/remote-wipe-iphone-or-ipad/, 4 pages, printed from the Internet on Feb. 2, 2013.
"Screen hotspot," Wikipedia, the free encyclopedia, http://en.wikipedia.org/wiki/Screen_hotspot, 1 page, printed from the Internet on May 15, 2013.
"PAiA—Touch Switches," PAiA Corporation USA, file:///S:/Client%20Files/Barnes%20&%20Noble/IDS%20Master%20Folder/S&G%20-%2..., 3 pages, printed from the Internet on Aug. 27, 2013.
Kanai, et al., "Intra-Rendition Navigation," Copyright 2012-2013 International Digital Publishing Forum (IDPF), 13 pages.
"Explaining how the sPen tech works (and is very diff than other styluses)," http://forum.xda-developers.com/showthread.php?t=, 1 page, printed from the Internet on Jan. 15, 2013.

\* cited by examiner

STYLUS WITH ACTIVE COLOR DISPLAY/SELECT FOR TOUCH SENSITIVE DEVICES

FIELD OF THE DISCLOSURE

This disclosure relates to touch sensitive devices, and more particularly, to styluses used for interacting with touch sensitive devices.

BACKGROUND

Electronic display devices such as tablets, eReaders, mobile phones, smart phones, personal digital assistants (PDAs), and other such touch sensitive electronic devices are commonly used for displaying, consumable content. The content may be, for example, an e-book, an online article, images, documents, or video, just to name a few types. Such display devices are also useful for displaying a user interface that allows a user to interact with the displayed content. The user interface may include, for example, one or more touch screen controls and/or one or more displayed labels that correspond to nearby hardware buttons. The user may interact with the touch sensitive device using fingers or a stylus. The use of a stylus may increase the user's input accuracy or facilitate user input, especially when writing or drawing on a touch sensitive electronic device.

DETAILED DESCRIPTION

Figure 1A:
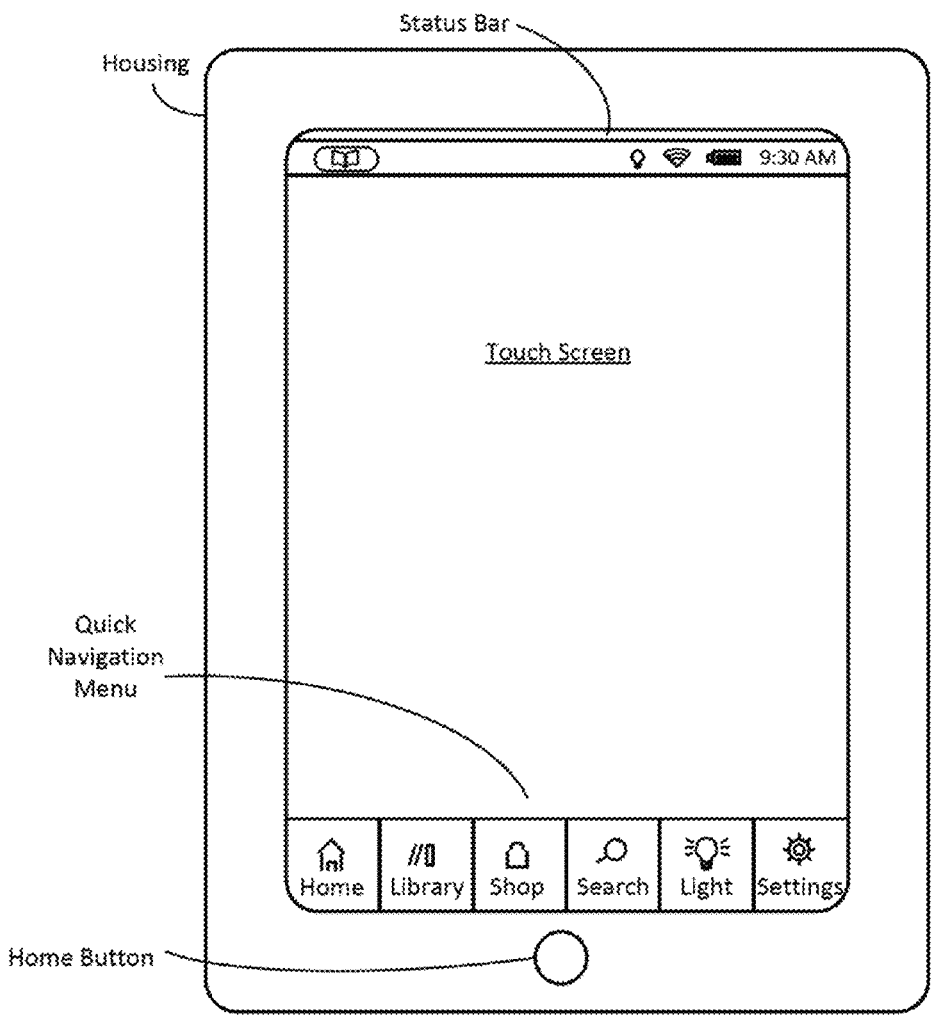
FIGS. 1a-b illustrate an example electronic touch sensitive device configured for use with one or more embodiments of the present invention.

Styluses with active color display functionality are disclosed. The styluses are intended for use with a touch sensitive device (such as a smart phone, eReader, or tablet computer). The active color refers to the color being used by the touch sensitive device, such as in a virtual drawing or note taking application. Active colors can be selected using the touch sensitive device or, in some cases, the stylus itself. When the active color is selected using the touch sensitive device, the stylus receives the active color information in order to display or otherwise indicate the color on the stylus. When the active color is selected from the stylus itself, that color is displayed or indicated on the stylus and the active color information is transmitted to the touch sensitive device. For example, the active color can be physically represented on the stylus using a multi color light-emitting diode (LED) or a color wheel rotation mechanism. The active color can be displayed such that it is detectable regardless of stylus position no blind spots).

General Overview

As previously explained, electronic touch sensitive devices such as tablets, eReaders, and smart phones are commonly used for displaying user interfaces and consumable content. As was also explained, styluses and other implements are sometimes used to interact with these and other electronic touch sensitive devices. For example, a stylus or other implement may be used to increase input accuracy or comfort, such as when writing or drawing on a touch sensitive device. In applications such as these, where a user can select different colors for various application tools, the active color is displayed on the screen of the device. While displaying the active color on the screen informs the user which color is selected, it also takes up screen space. Further, the active color may not always be displayed or may otherwise be blocked from the user's view in some situations (e.g., by the user's hand), generally leading to a diminished, user experience.

Thus, and in accordance with an embodiment of the present invention, styluses with active color display functionality are provided for use with touch sensitive devices. Some stylus embodiments have the additional functionality of being able to select an active color from the stylus itself. As previously described, the term active color refers to the color of an input for an application or service used on an electronic touch sensitive device. For example, the active color can be selected as the color of a pen in a note taking application, the color of a paintbrush in a drawing application, or the color of a text highlight tool when highlighting electronic documents or selecting text within such documents, just to name a few applications. In some instances, particularly where tool or text color cannot change (such as may be the case when creating a note in an eReader application, for instance), the active color may be alternatively used to indicate, for example, the background color of newly created notes when the user selects the note tool and creates a note. Other such active color schemes will be apparent in light of this disclosure. By displaying the active color on the stylus itself instead of the touch sensitive device, the user is constantly informed of the active color without taking up screen space on the electronic device. Further, displaying the active color on the stylus itself so that it can be seen by the user, regardless of the stylus position with respect to the user's eyes, provides a more natural and intuitive user experience.

The active color display and active color select functions, and the related modules described herein, can be implemented in the hardware, software, and/or firmware of the touch sensitive device and stylus, as will be apparent in light of this disclosure. The principles provided herein apply equally to any implement used for interacting with a touch sensitive device. For ease of description, examples are provided herein using styluses; however, the claimed invention is not intended to be limited to any particular kind or type of implement. Numerous styluses and implement form factors having an active color indicator will be apparent in light of this disclosure, including styluses that have the additional functionality of being able to select an active color from the stylus itself.

Device and Stylus Examples

Figure 1B:
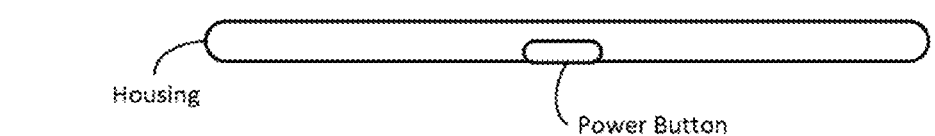

FIGS. 1a-b illustrate an example electronic touch sensitive device configured for use with one or more embodiments of the present invention. The device could be, for example, a tablet such as the NOOK® tablet by Barnes & Noble. In a more general sense, the device may be any electronic device having a touch sensitive user interface and capability for displaying content to a user, such as a mobile phone or mobile computing device such as an eReader or laptop, a desktop computing system, a television, a smart display screen, or any other device having a touch screen display or a non-touch display screen that can be used in conjunction with a touch sensitive surface. As will be appreciated in light of this disclosure, the styluses described herein are not intended to be limited for use with any particular kind or type of touch sensitive device.

As can be seen with this example configuration, the device comprises a housing that includes a number of hardware features such as a power button and a press-button (sometimes called a home button herein). A touch screen based user interface is also provided, which in this example embodiment includes a quick navigation menu having six main categories to choose from (Home, Library, Shop, Search, Light, and Settings) and a status bar that includes a number of icons (a night-light icon, a wireless network icon, and a book icon), a battery indicator, and a clock. Other touch sensitive devices may have fewer or additional such user interface (UI) touch screen features, or different UI touch screen features altogether, depending on the target application of the device. Any such general UI controls and features can be implemented using any suitable conventional or custom technology, as will be appreciated.

The power button can be used to turn the device on and off, and may be used in conjunction with a touch-based UI control feature that allows the user to confirm a given power transition action request (e.g., such as a slide bar or tap point graphic to turn power off). In this example configuration, the home button is a physical press-button that can be used as follows: when the device is awake and in use, tapping the button will display the quick navigation menu, which is a toolbar that provides quick access to various features of the device. The button may also control other functionality if, for instance, the user presses and holds the home button. For instance, an example such push-and-hold function could engage a power conservation routine where the device is put to sleep or an otherwise lower power consumption mode. Thus, the home button may be associated with and control different and unrelated actions: 1) show the quick navigation menu, 2) temporarily disable the active color display function, and 3) put the device to sleep. In some cases, note that the stylus may be configured to stop displaying the active color when the related touch sensitive device is in such a lower power consumption mode (e.g., a sleep mode). The styluses described herein may be used with numerous other touch sensitive devices and the example provided in FIGS. 1a-b and described herein is not intended to limit the claimed invention in any way.

Figure 1C:
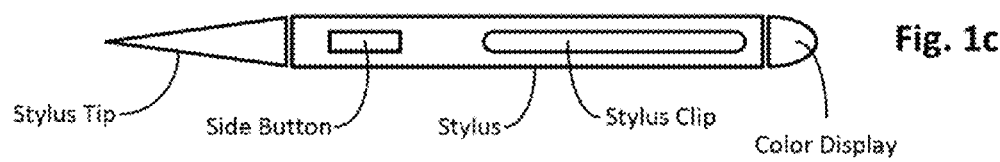
FIG. 1c illustrates an example stylus in accordance with an embodiment of the present invention.

FIG. 1c illustrates an example stylus in accordance with an embodiment of the present invention. As can be seen, in this particular configuration, the stylus comprises a stylus tip that can be used to directly or otherwise proximately contact the touch sensitive surface. The stylus may be a capacitive stylus, an active stylus, or any other suitable pen-like implement for interacting with the touch sensitive surface. The stylus also includes a side button and a stylus clip along the shaft of the stylus. The side button may be used to activate various functions associated with the stylus, including a secondary active color, in some embodiments. For example, in applications such as electronic paint programs, the stylus may be configured to draw with a primary active color when the side button is not depressed and to draw with the secondary active color when the side button is depressed, in some embodiments. In another example, the side button could be used to activate the last color used, if different from the current color, when depressed. Other embodiments of the stylus may include fewer or additional control features, or different control features altogether. Such control features may include, for example, a rotating mechanism, a switch, a sliding control bar, a scroll wheel, and/or any other control feature, including the ones used to implement the active color select function, as described herein. The stylus may also be configured to use gestures to perform some of the functions that the control features can be used to perform, in some embodiments.

The stylus shown in FIG. 1c also includes a color display on the top of the stylus. As previously described, the color display can inform the user of the color that will be used when interacting with the touch sensitive device (e.g., the active color). In general, the color display may use any combination of suitable hardware, software, and/or firmware to indicate the active color from the stylus itself. For example, in the embodiment shown in FIG. 1c, the color display section of the stylus may be a clear plastic top that houses a multi-colored LED and related, circuitry for displaying the active color from the stylus. As will be apparent in light of this disclosure, these components—the clear plastic top housing, multi-colored. LED, and related circuitry could be part of the color display module for this example stylus embodiment. In other embodiments, the color display module is a sub-set of such components, such as the clear plastic top housing and multi-colored LED, or just the multi-colored LED, deployed in such a manner so as to provide 360 degrees of visibility. In such example embodiments, the stylus may include a power source, such as a rechargeable battery, to provide power to one or more of the modules described herein. In instances where the stylus includes a rechargeable battery, the battery may be recharged, for example, by docking the pen in a related touch sensitive device.

As will be further appreciated in light of this disclosure, while the color indication mechanism multi-colored LED circuit, color LCD circuit, mechanical color wheel that turns in response to a control signal, or other color indicating mechanism) is implemented in the stylus itself, the supporting circuitry and/or software may be implemented in the stylus or the computing device or a combination of the stylus and computing device. To this end, the degree of intelligence and memory in the stylus may vary from none in some embodiments (where the related computing device controls the color indication process) to other embodiments where the stylus is configured with enough intelligence and memory to execute or otherwise control some or all of the various color selection and indication tasks as described herein. For instance, in some embodiments, the stylus only includes the color indication mechanism along with a battery and a wireless receiver circuit configured to receive control signals from the computing device, wherein the control signals are received by the receiver circuit and cause the color indication mechanism to display or otherwise indicate the desired, color that is currently active. The control signals can be generated, for example, by firmware/software executing on the computing device in response to the user selecting a color for a given task, such as a drawing or content selection task. In other embodiments, the stylus includes a color indication mechanism along with a battery and a wireless transceiver circuit configured to both receive control signals from the computing device and to transmit control signals to the computing device based on user inputs via the stylus control features. In both these example embodiments, note that no intelligence (e.g., processor or memory) need be included in the stylus. Still other embodiments of the stylus may include a local processor configured to interact with the processor of the related touch sensitive computing device. Numerous different stylus embodiments and implementations will be apparent in light of this disclosure.

In one or more embodiments, the stylus may be configurable by changing the settings of the stylus from a related touch sensitive computing device or from the stylus itself. In one particular embodiment, a stylus active color display/select configuration sub-menu, such as the one shown in FIG. 2b, may be accessed by tapping or otherwise selecting the Settings option in the quick navigation menu, which causes the example devices shown in FIGS. 1a-b to display the general sub-menu shown in FIG. 2a. From this general sub-menu, the user can select any one of a number of options, including one designated Stylus in this specific example case. Selecting this sub-menu item (with an appropriately placed screen tap) may cause the configuration sub-menu of FIG. 2b to be displayed, to allow for the stylus settings to be configured, in accordance with one or more embodiments. As previously described, in some embodiments, the stylus may be configurable from the stylus itself. In some other embodiments, the stylus may be configurable from the active application on the touch sensitive device (e.g., from the settings menu of a paint program). In other embodiments, the stylus color indication functionality may be hard-coded such that no settings configurations are needed or otherwise provided.

As will be appreciated, the various UI control features and sub-menus displayed to the user are implemented as ill touch screen controls in this example embodiment. Such UI touch screen controls can be programmed or otherwise configured using any number of conventional or custom technologies. In general, the touch screen translates the user touch in a given location into an electrical signal which is then received and processed by the underlying operating system (OS) and circuitry (processor, etc). The user touch may be performed with a finger, a stylus, or any other suitable implement, unless otherwise specified. In some instances, one or more embodiments of the styluses described herein may not need to actually physically touch a related touch sensitive device to perform any of the following: 1) interact with the device, 2) receive active color information from the device, or 3) transmit active color information to the device. For example, the stylus may be configured to transmit interactions to a related touch sensitive device when hovering over the touch sensitive surface of the device e.g., within 3 inches of the touch screen) or the stylus may be configured to receive active color information from the related computing device if they are within a certain range of each other, such as 1 meter, via a wireless communication link. In still other embodiments, the stylus may be tethered to the computing device via a wired connection. Any number or combination of interface schemes (via the touch sensitive surface and/or one or more wired/wireless communication links) can be used between the stylus and computing device.

Figure 2A:
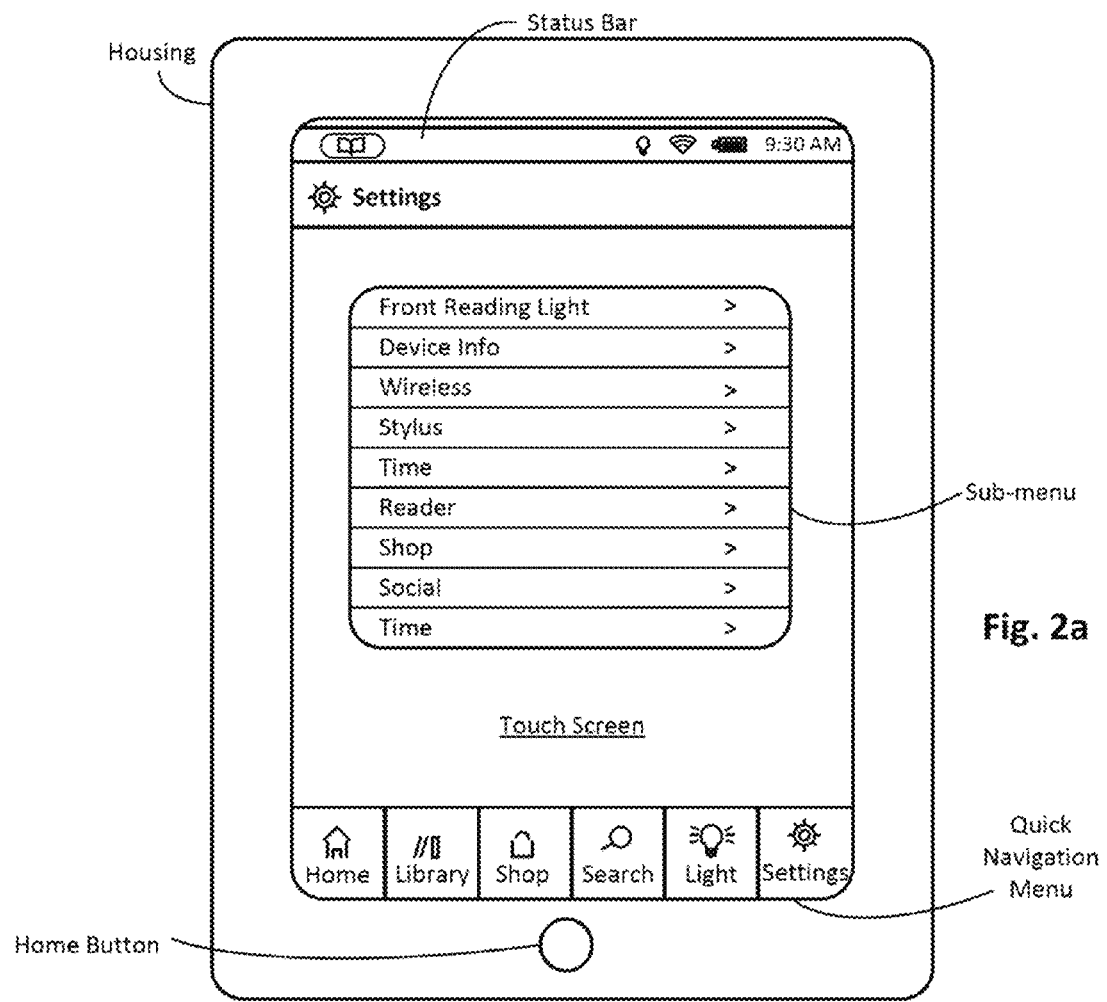
FIGS. 2a-b illustrate example configuration screen shots for the settings of a stylus configured in accordance with an embodiment of the present invention.
Figure 2B:
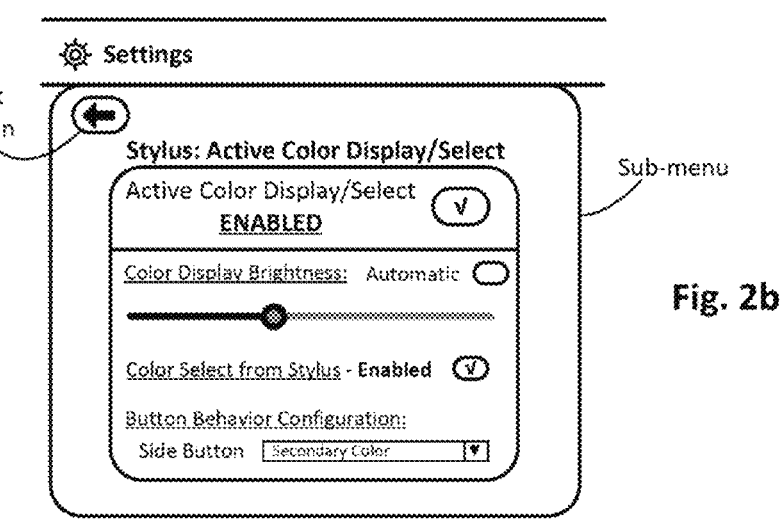

Continuing with the stylus active color display/select settings sub-menu shown in FIG. 2b, once this sub-menu is displayed, the user can then select different options to configure the stylus as desired. In particular, the Active Color Display/Select function may be enabled or disabled as desired (shown in the enabled state). Other embodiments may have the Active Color Display/Select function always enabled (by default or hard-coded), or enabled by a physical switch or button, for example.

Depending on the implementation of the color indication mechanism, the Color Display Brightness may be adjusted (shown set at 40% brightness). Such a brightness adjust feature may be appropriate, for example, where the color indication mechanism is implemented with a multi-color LED, wherein the brightness is a function of current sourced to the LED. Thus, if the user is in a room with dim or no lighting (e.g., night time use while lying in bed), the user could set the intensity to a lower level; in contrast, the user could set the intensity to a higher level in a brightly lit room. In power conservation modes, such as when the stylus power source is detected to be below a given threshold, the brightness may be automatically limited to conserve power. Such limitation could be indicated, for instance, by graying out the brightness adjust feature or graying out an upper range of the brightness scale. In other embodiments, the brightness may be fixed or otherwise set to a default value. In some cases, the brightness may be set to Automatic, where the Color Display Brightness adjusts to the ambient light detected by the stylus or related computing device (automatic brightness is shown in the disabled state allowing a set brightness to be manually selected). In such cases, the ambient light can be detected, for example, by an ambient light sensor of the computing device which can be programmed or otherwise configured to send a brightness control signal to the stylus based on the detection signal from the sensor; in other such embodiments, the stylus can be configured with an ambient light sensor. As will be appreciated, similar brightness control schemes can be used with other active color indication mechanisms, such as a miniature color liquid crystal display (LCD) circuit. In embodiments where the color indication mechanism is implemented with a mechanical color wheel or other such active color indicators, there may be no brightness control feature.

With further reference to FIG. 2b, the Color Select from the Stylus option may be enabled or disabled as desired (shown as enabled), so as to allow for the ability to select an active color from the stylus itself. In some cases, if an embodiment of the stylus is being, used that lacks the ability to select an active color from the stylus itself, then the Color Select from the Stylus settings option may either be unselectable, (e.g., it is set at disabled and cannot be changed) or the enabling of this option may be irrelevant (i.e., it has no affect) or the configured option is simply not displayed.

If the stylus has control features as previously described, then those control features may be configurable as well. For example, the final settings option shown in FIG. 2b relates to Button Behavior Configuration. In this specific example, the behavior of the Side Button (such as the one shown in FIG. 1c) is configurable. In some instances, a button or other control feature may be configured to perform functions such as to use a secondary active color, to erase (e.g., pressing the button engages an erase or un-do mode), to switch between pre-selected active colors (e.g. multiple different colors may be pre-selected and a control feature may toggle through these pre-selected colors), or to enable/disable hold mode (e.g., select the button to enabled/disable a hold mode that prevents the stylus from writing/drawing), just to name a few example functions. Accordingly, the stylus may be configured to adjust to the given selection to inform the user of same. For example, switching to a secondary active color changes the color display to that secondary active color, switching to an erase function changes the color display to white or reverses the previous action, switching between different pre-selected colors changes the color display to the currently active pre-selected color, and switching to a hold mode makes the active color blink, just to name a few examples. The information relating to use of a control feature may also be transmitted to the touch sensitive device for display on the device's screen. As shown in FIG. 2b, the Side Button in this example embodiment is configured to perform a Secondary Color function.

As can be further seen, a back button arrow UI control feature may be provisioned on the touch screen for any of the menus provided, so that the user can go back to the previous menu, if so desired. Note that configuration settings provided by the user can be saved automatically (e.g., user input is saved as selections are made or otherwise provided). Alternatively, a save button or other such UI feature can be provisioned, which the user can engage as desired.

Numerous other configurable aspects and functions will be apparent in light of this disclosure. For instance, in some embodiments, the stylus may be configured based on an active application or the specific content being displayed. For instance, in drawing or painting applications, the color display may show the active color of the tool being used (e.g., paintbrush, pencil, or marker tool), whereas in content viewing applications, the color display may only show the active color of a highlighting tool. Thus, the techniques provided herein can be implemented on a global level, a content based level, or an application level, in some example cases. As will be further appreciated in light of this disclosure, while FIGS. 2a and 2b show user configurability other embodiments may not allow for any such configuration, wherein the various features provided are hard-coded or otherwise provisioned by default. The degree of hard-coding versus user-configurability can vary from one embodiment to the next, and the claimed invention is not intended to be limited to any particular configuration scheme of any kind.

Architecture

Figure 3A:
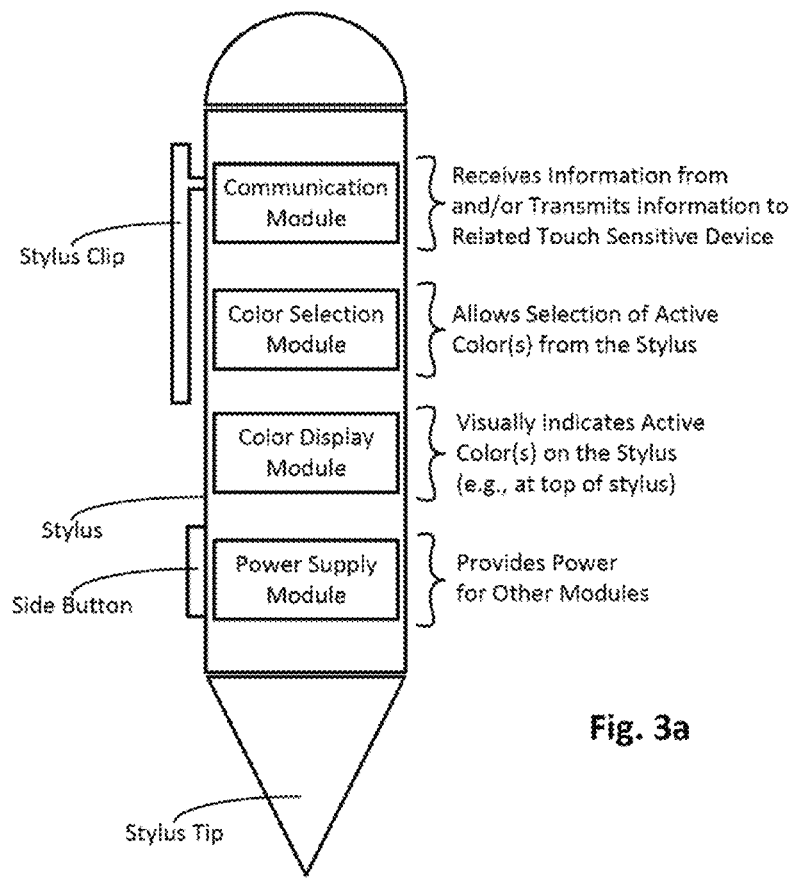
FIG. 3a illustrates a stylus configured with an active color display and/or select function, in accordance with one or more embodiments of the present invention.

FIG. 3a illustrates a stylus configured with an active color display and/or select function, in accordance with an embodiment of the present invention. As can be seen, the example stylus shown includes the following modules: 1) a communication module, 2) a color selection module, 3) a color display module, and 4) a power supply module. Generally, 1) the communication module is configured to receive information from and/or transmit information to a related, touch sensitive computing device (e.g., active color information), 2) the color selection module allows the active color(s) to be selected from the stylus, 3) the color display module displays or otherwise indicates the active color(s) on the stylus, and 4) the power supply module provides power to the stylus including the other modules. Some embodiments may include all of these modules, while other embodiments may include select modules, as will be apparent in light of this disclosure. These modules are not intended, to imply distinct modules, since some of the corresponding components of each module may overlap or be shared. They are shown separated for ease of description. Other embodiments may include other componentry depending on the desired degree of local intelligence and/or functionality, such as a processor, memory/storage, antenna and/or one or more sensors (e.g., ambient light sensor). The optional processor can be any suitable processor and may be programmed or otherwise configured to assist in controlling the stylus, and may receive input from the user from control features, including the top and side buttons. The optional storage may be implemented with any suitable memory and size (e.g., 2 to 4 GBytes of flash memory).

The communication module can be configured to receive information from and/or transmit information to a related electronic touch sensitive device. The information received/transmitted may include any information related to selected colors as previously explained, as well as any relevant information related to the active color display and/or active color select functions. Information related to the stylus color display/select functions may include, for example, that a sleep mode or a hold mode is desired. In these examples, the stylus may stop displaying the active color when a sleep mode is activated, or the stylus may blink the active color display when a hold mode is activated. Some stylus embodiments may include communication modules that only receive information, which would require active colors and other functions to be selected using the related computing device. Some other stylus embodiments may include communication modules that only transmit information, which would require active colors and other functions to be selected using the stylus itself. While some stylus embodiments may include communication modules that both receive and transmit information (transceiver), allowing a user to select active colors and other functions from either the stylus or the device.

The communication module can be implemented with any number of suitable technologies to allow the stylus to receive/transmit information. In some embodiments, the stylus may be connected to a related device using a wire, where the wire allows the stylus to receive information from and/or transmit information to the related device. In other embodiments, the communication module may be wireless and use any number of short-range or long-range wireless communication technologies, such as near field communication (NFC), radio-frequency identification (RFID), Bluetooth, Wi-Fi, electromagnetic, infrared or other light communication technologies, radio frequency (RF) or other radio communication technologies, or any other suitable communication technology that at least allows active color information to be transferred wirelessly from the stylus to the related touch sensitive device. Conventional or custom discovery and handshake protocols can be used to introduce or otherwise relate a given stylus with a given device, in accordance with some embodiments. In some such cases, a software driver that comes with the stylus can be loaded onto the target computing device, so as to enable the communication between the device and stylus as well as the functionality described herein. Such plug and play functionality can be implemented using any number of suitable self-discovery based communication protocols. Depending on the target price point of the stylus, such protocols may be heavy (e.g., Wi-Fi) or light (e.g., NFC or Bluetooth). Other embodiments may be paired at the factory level, where the device and stylus are specifically manufactured to work with one another and would not necessarily be interchangeable with other devices and systems.

Conventional or custom discover and handshake protocols can be used to introduce or otherwise relate a given stylus with a given device, in accordance with some embodiments. In some such cases, a software driver that comes with the stylus can be loaded onto the target electronic device, so as to enable the communication between the device and stylus as well as the functionality described herein. Such plug and play functionality can be implemented using any number of suitable self-discovery based communication protocols. Depending on the target price point of the stylus, such protocols may be heavy (e.g., or light (e.g., NFC or Bluetooth). In some embodiments, the pairing or relating of the device and stylus may be required before using the stylus color display/select functionality described herein.

The color selection module can be configured to allow the selection of active colors from the stylus itself. Stylus embodiments that do not have the ability to select active colors from the stylus may not include a color selection module. The color selection module can be implemented to facilitate active color selection from the stylus itself. For example, the color selection module may include a hardware control feature, such as a mechanical color rotation mechanism that allows a user to twist the mechanism to select the desired, active color (see FIG. 4, for example). Other control features may be used to allow a user to select a desired active color from the stylus itself, such as a button, a switch, a sliding control bar, a scroll wheel, and/or any other control feature suitable for a stylus or other implement used for interacting with touch sensitive devices. The color selection module may also be configured to recognize gestures programmed to select different colors. The color selection module may be configured to work in conjunction with the related computing device, such that color requests from the color selection module are communicated to the device which in to displays color choices to the user in response to such requests. The user can then in turn parse the choices using the stylus (e.g., through direct-touching, near-touching, or flicking/swiping gestures) and make a color selection.

Once a user makes a color selection using the color selection module, that active color information can be transmitted to a related touch sensitive device (if not already known by the device). The color selection module may also facilitate other functions described herein, such as a secondary color selection function. For example, in some stylus embodiments, a control feature (such as the side button shown in FIG. 3a) may control whether the stylus will write/draw using a primary active color or a secondary active color. In this example, the stylus will use the primary active color when the button is not depressed and the secondary active color when the button is depressed.

The color display module can be configured to display or otherwise visually indicate active colors on the stylus. The active color can be indicated using various different technologies that inform a user of one or more currently active colors. For example, the color display module may use a lighting system that includes one or more LEDs to emit the selected active color on the stylus. In other stylus embodiments, the available active colors may be displayed on a control feature, such as a mechanical color rotation mechanism or a mini-LCD circuit. Note that in some embodiments, both the color selection and color display modules may be implemented in a single module which facilitates both the selection of an active color and the visual indication of that color. This is illustrated in the example shown in FIGS. 4a-c as will be described in turn. The color display module may provide additional information to a user. For example: in embodiments using a lighting system for the color display module, the module may be configured to blink when the stylus is in a hold mode; in embodiments using a LCD circuit for the color display module, the module may be configured to display HOLD when the stylus is in a hold mode.

The color display module may be configured to display the active color anywhere on the stylus itself. In some instances, the color display may be on the top end of the stylus, as is shown in FIG. 1c. In other instances, the color may be displayed in or near the stylus tip. In some cases, the stylus may display more than one color, such as for use with applications that utilize a secondary color option. For example, the stylus may have a color display module that displays the primary active color in an upper ring on the stylus and the secondary active color in a lower ring on the stylus.

As previously described the color display module visually indicates the active color(s) on the stylus itself. In some embodiments, the color is displayed on the stylus such that a user can see the active color(s) when holding the stylus in a typical fashion, no matter the orientation of the stylus. In other words, the color display module may provide 360 degrees of visibility. For example, this may be achieved by displaying the active color on a substantial portion of the top of the stylus, such as is shown in FIG. 1c. In other embodiments, the active color display module may display the active color(s) in rings around the stylus. The 360 degrees of visibility provides a benefit over displaying the active color(s) on only one side of the stylus, since it allows a user to quickly and easily identify the active color(s) without having to reorient stylus. In these embodiments, displaying the active colors) with 360 degrees of visibility is particularly helpful when selecting the active color(s) from the stylus itself using the color selection modules as variously described herein. For example, 360 degrees of active color(s) visibility allows a user to shuffle through a set of available colors using a stylus control feature, such as a scroll wheel, and still see the selected colors even where the user's hand may be blocking a substantial portion of the stylus. Numerous variations and configurations will be apparent in light of this disclosure.

The power supply module can be configured to provide power to the stylus, including the other modules, and can be implemented any suitable power source, such as a lithium ion battery and/or power scavenging circuitry. In some embodiments, the stylus may use a rechargeable battery that is recharged by the related touch sensitive device (e.g., by placing it into the device's stylus dock). In other embodiments where the stylus is tethered to the computing device, power may be provided from the power source of that device. In still other embodiments, the stylus may be tethered to any suitable power source.

Figure 3B:
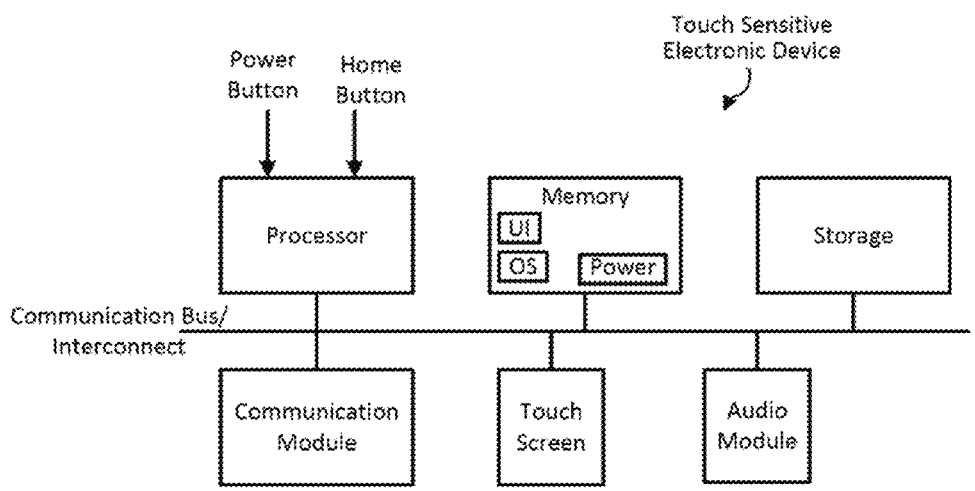
FIG. 3b illustrates a touch sensitive computing device configured with an active color display and/or select function, in accordance with one or more embodiments of the present invention.

FIG. 3b illustrates a block diagram of an electronic touch screen device configured in accordance with an embodiment of the present invention. As can be seen, this example device includes a processor, memory (e.g., RAM and/or ROM for processor workspace and storage), additional storage/memory (e.g., for content), a communications module, a touch screen, and an audio module. A communications bus and interconnect is also provided to allow inter-device communication. Other typical componentry and functionality not reflected in the block diagram will be apparent (e.g., battery, coprocessor, etc). Further note that although a touch screen display is provided, other embodiments may include a non-touch screen and a touch sensitive surface such as a track pad, or a touch sensitive housing configured with one or more acoustic sensors, etc. In any such cases, the touch sensitive surface is generally capable of translating a user's physical contact with the surface into an electronic signal that can be manipulated or otherwise used to trigger a specific user interface action. The principles provided herein equally apply to any such touch sensitive devices. For ease of description, examples are provided with touch screen technology.

The touch sensitive surface (touch sensitive display in this example) can be any device that is configured with user input detecting technologies, whether capacitive, resistive, acoustic, active or passive stylus, and/or other input detecting technology. The screen display can be layered, above input sensors, such as a capacitive sensor grid for passive touch-based input (such as with a finger or passive stylus in the case of a so-called in-plane switching (IPS) panel), or an electro-magnetic resonance (EMR) sensor grid (e.g., for sensing a resonant circuit of the stylus). In some embodiments, the ouch screen display can be configured with a purely capacitive sensor, while in other embodiments the touch screen display may be configured to provide a hybrid mode that allows for both capacitive input and EMR input, for example. In still other embodiments, the touch screen display is configured with only an active stylus sensor. In any such embodiments, a touch screen controller may be configured to selectively scan the touch screen display and/or selectively report contacts detected directly on or otherwise sufficiently proximate to (e.g., within a few centimeters) the touch screen display. Numerous touch screen display configurations can be implemented using any number of known or proprietary screen based input detecting technology.

In one example embodiment, stylus interaction can be provided by, for example, placing the stylus tip on the stylus detection surface, or sufficiently close to the surface (e.g., hovering one to a few centimeters above the surface, or even farther, depending on the sensing technology deployed in the stylus detection surface) but nonetheless triggering a response at the device just as if direct contact were provided on a touch screen display. As will be appreciated in light of this disclosure, an styluses as used herein may be implemented with any number of stylus technologies, such as the technology used in DuoSense® pens by N-Trig® (e.g., wherein the stylus utilizes a touch sensor grid of a touch screen display) or EMR-based pens by Wacom technology, or any other commercially available or proprietary stylus technology. Further recall that the stylus sensor in the computing device may be distinct from an also provisioned touch sensor grid in the computing device. Having the touch sensor grid separate from the stylus sensor grid may allow the device to, for example, only scan for a stylus input, a touch contact, or to scan specific areas for specific input sources in accordance with some embodiments. In one such embodiment, the stylus sensor grid includes a network of antenna coils that create a magnetic field which powers a resonant circuit within the stylus. In such an example, the stylus may be powered by energy from the antenna coils in the device and the stylus may return the magnetic signal back to the device, thus communicating the stylus' location, color select control feature input, etc. Such an embodiment may also eliminate the need for a battery on the stylus.

Continuing with the example electronic touch sensitive device embodiment shown in FIG. 3b, the memory includes a number of modules stored therein that can be accessed and executed by the processor (and/or a co-processor). The modules include an operating system (OS), a user interface (UI), and a power conservation routine (Power). The modules can be implemented, far example, in any suitable programming language e.g., C, C++, objective C, JavaScript, custom or proprietary instruction sets, etc), and encoded on a machine readable medium, that when executed by the processor (and/or co-processors), carries out the functionality of the device including a UI having a stylus color display/select function as described herein. The computer readable medium may be, for example, a hard drive, compact disk, memory stick, server, or any suitable non-transitory computer/computing device memory that includes executable instructions, or a plurality or combination of such memories. Other embodiments can be implemented, for instance, with gate-level logic or an application-specific integrated circuit (ASIC) or chip set or other such purpose built logic, or a microcontroller having input/output capability (e.g., inputs for receiving user inputs and outputs for directing other components) and a number of embedded routines for carrying out the device functionality. In short, the functional modules can be implemented in hardware, software, firmware, or a combination thereof.

The processor can be any suitable processor (e.g., 800 MHz Texas Instruments OMAP3621 applications processor), and may include one or more co-processors or controllers to assist in device control. In this example case, the processor receives input from the user, including input from or otherwise derived from the power button and the home button. The processor can also have a direct connection to a battery so that it can perform base level tasks even during sleep or low power modes. The memory (e.g., for processor workspace and executable file storage) can be any suitable type of memory and size (e.g., 256 or 512 Mbytes SDRAM), and in other embodiments may be implemented with non-volatile memory or a combination of non-volatile and volatile memory technologies. The storage (e.g., for storing consumable content and user files) can also be implemented with any suitable memory and size (e.g., 2 GBytes of flash memory). The display can be implemented, for example, with a 6-inch E-ink Pearl 800×600 pixel screen with Neonode® zForce® touch screen, or any other suitable display and touch screen interface technology. The communications module can be configured to execute, for instance, any suitable protocol which allows for connection to the stylus. Example communications modules may include an NFC (near field connection), Bluetooth, 802.11 b/g/n WLAN, or other suitable chip or chip set that allows for wireless connection to the stylus (including any custom or proprietary protocols). In some embodiments, a wired connection can be used between the stylus and device. In some specific example embodiments, the device housing that contains all the various componentry measures about 6.5" high by about 5" wide by about 0.5" thick, and weighs about 6.9 ounces. Any number of suitable form factors can be used, depending on the target application (e.g., laptop, desktop, mobile phone, etc). The device may be smaller, for example, for smartphone and tablet applications and larger for smart computer monitor applications.

The operating system (OS) module can be implemented with any suitable OS, but in some example embodiments is implemented with Google Android OS or Linux OS or Microsoft OS or Apple OS. As will be appreciated in light of this disclosure, the techniques provided herein can be implemented on any such platforms. The power management (Power) module can be configured, for example, to automatically transition the device to a low power consumption or sleep mode after a period of non-use. A wake-up from that sleep mode can be achieved, for example, by a physical button press and/or a touch screen swipe or other action. The user interface (UI) module can be, for example, based on touch screen technology and the various example screen shots shown in FIGS. 1a, 2a-b, and 5a-c, in conjunction with the stylus color select methodologies demonstrated in FIG. 6, which will be discussed in turn. The audio module can be configured, for example, to speak or otherwise aurally present a selected eBook table of contents or other textual content or to aurally present the color selection provided by the stylus (in some embodiments), if preferred by the user. Numerous commercially available text-to-speech modules can be used, such as Verbose text-to-speech software by NCH Software. In some example cases, if additional space is desired, for example, to store digital books or other content and media, storage can be expanded via a microSD card or other suitable memory expansion technology (e.g., 32 GBytes, or higher). Further note that although a touch screen display is provided, other embodiments may include a non-touch screen and a touch sensitive surface such as a track pad, or a touch sensitive housing configured with one or more acoustic sensors, etc.

Example Stylus Color Display/Select Functions

Figures 4A, 4B:
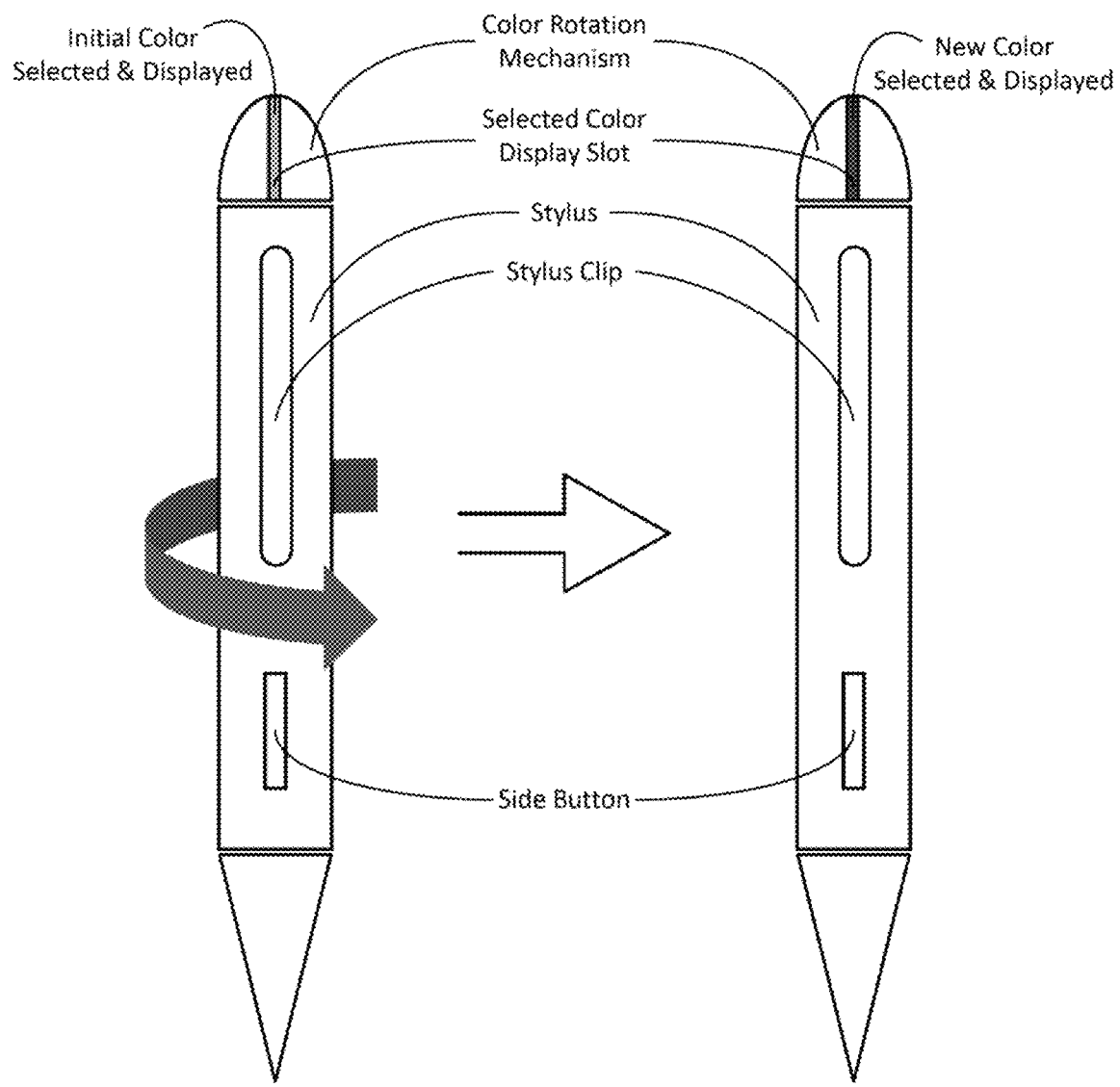
FIGS. 4a-b illustrate an example stylus having color selection functionality in accordance with an embodiment of the present invention.

FIGS. 4a-b illustrate an example stylus having color selection functionality in accordance with an embodiment of the present invention. FIG. 4a shows the example stylus having an initial color selected and displayed, and FIG. 4b shows the example stylus having a new color selected and displayed. Since the color is selected from the stylus itself in this example embodiment, the communication module of the stylus is configured to transmit the selected color information to a related, touch sensitive device to indicate the active color. As can be seen in the example embodiment of FIG. 4a, the active color is selected by twisting the stylus along its axis relative to the color rotation mechanism stylus. This twisting motion changes the color shown in the selected color display slot from the initial color in FIG. 4a to the new color in FIG. 4b and provides feedback to the color selection module to indicate the desired active color. The active color information is transmitted from the stylus to the related device once the stylus is within a suitable range of the device (depending on factors such as the environment and the communication technology used). The user may then write, draw, highlight, etc. on the touch sensitive device using the selected active color, as indicated on the stylus.

As will be appreciated, other embodiments need not be configured with such stylus-based color selection configurability. In such cases, the user can select the desired color for a given task using, for example, an application-based UI of the computing device, and that selected color can then be communicated to the stylus. The stylus can then set the color display accordingly so as to indicate that selected color. Numerous such variations will be apparent in light of this disclosure.

Figure 5A:
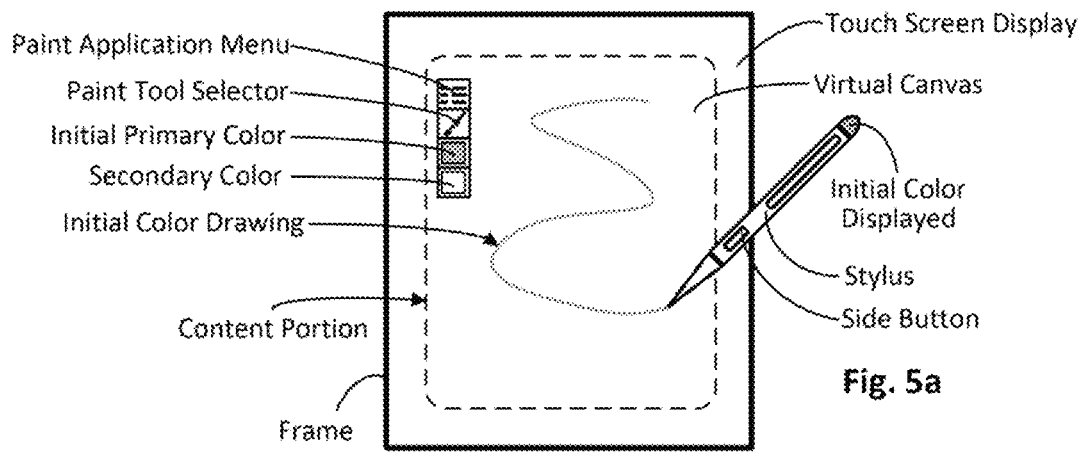
FIGS. 5a-c illustrate an example stylus being used with touch sensitive device, in accordance with an embodiment of the present invention.
Figure 5B:
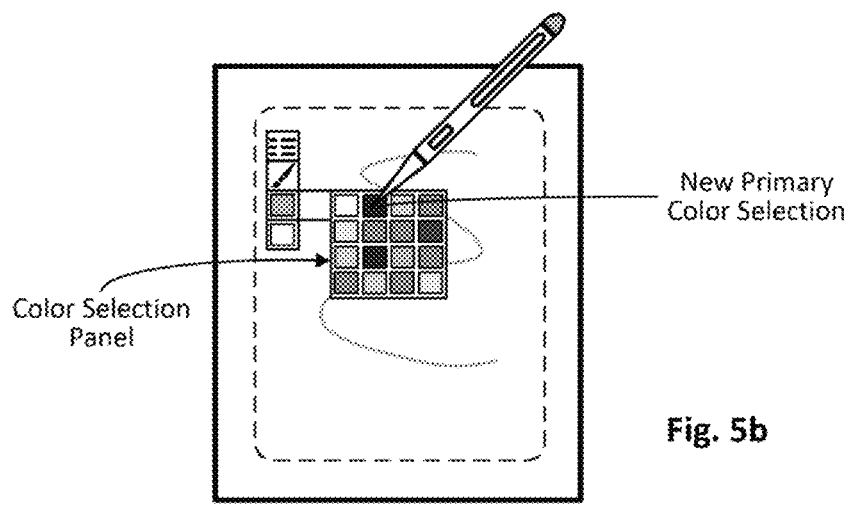
Figure 5C:
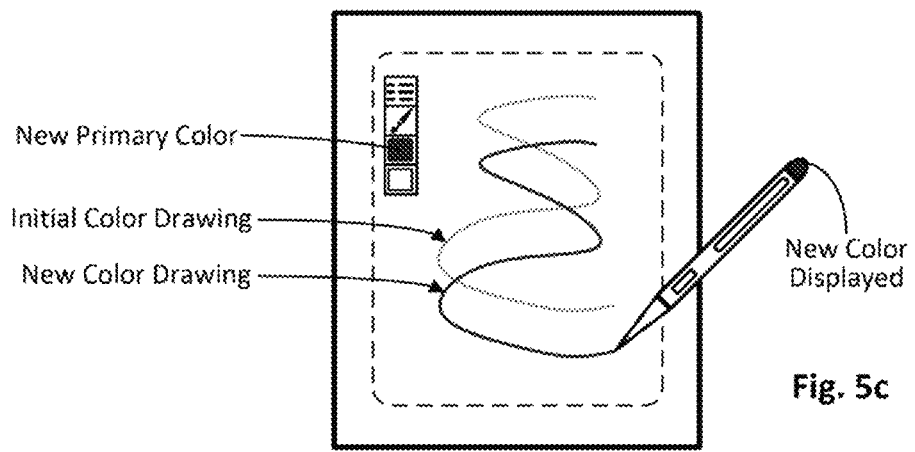

FIGS. 5a-c illustrate an example stylus being used with a touch sensitive device, in accordance with an embodiment of the present invention. As shown, the touch sensitive device includes a frame that houses a touch sensitive surface, which in this example, is a touch screen display. Some stylus embodiments may be used with touch sensitive surfaces that are separate from the display, such as is the case with a track pad. The touch screen display of the device contains a content portion (within the dashed line area). A drawing, application is running on the device and includes a virtual canvas where a user can make electronic drawings. The drawing application has four selectable boxes in the top left corner: a paint application menu box, a paint tool selector box, a primary color box, and a secondary color box. The paint application menu box may allow a user to open a new canvas, open a saved canvas, save the current canvas, exit the paint application program, or perform any other customary application menu action. The other three boxes allow the user to select the desired active paint tool, active primary color, and active secondary color, respectively. Numerous other drawing application functionalities can be configured as desired.

As shown in FIG. 5a, the example stylus embodiment has a side button and a color display. The initial primary color is being displayed/indicated, since that is currently the active color. As can also be seen, the user drew on the virtual canvas with the stylus in the initial color. The example stylus embodiment in FIGS. 5a-c does not include the functionality of selecting active colors from the stylus itself. Accordingly, a new color is selected by touching in the primary color box to bring up a color selection panel as shown in FIG. 5b. After the new primary color is selected (shown in FIG. 5b), the active color changes to that selection. This changes the color of the paint tool in the application and also changes the color of the color display on the stylus. As can be seen in FIG. 5c, the new active color is displayed on the stylus and the user drew a second shape on the canvas using the new color.

By using a stylus with active color display and/or select functions, additional features may be included to enhance the user experience. For example, the drawing application may not need to show the color selection boxes on the screen of the device as is done in FIGS. 5a-c, since the color is displayed on the stylus itself. This would provide more space in the virtual canvas for the user to draw on while still informing the user of the active color (in this case, from the top of the stylus). In another example feature, the stylus shown in FIGS. 5a-c can be configured such that when the side button is depressed, the secondary color becomes the active color (similar to a right mouse button click). When this occurs, and the secondary color becomes the active color, the color of the paint tool and color display on the stylus change to the selected secondary color shown.

Methodology

Figure 6:
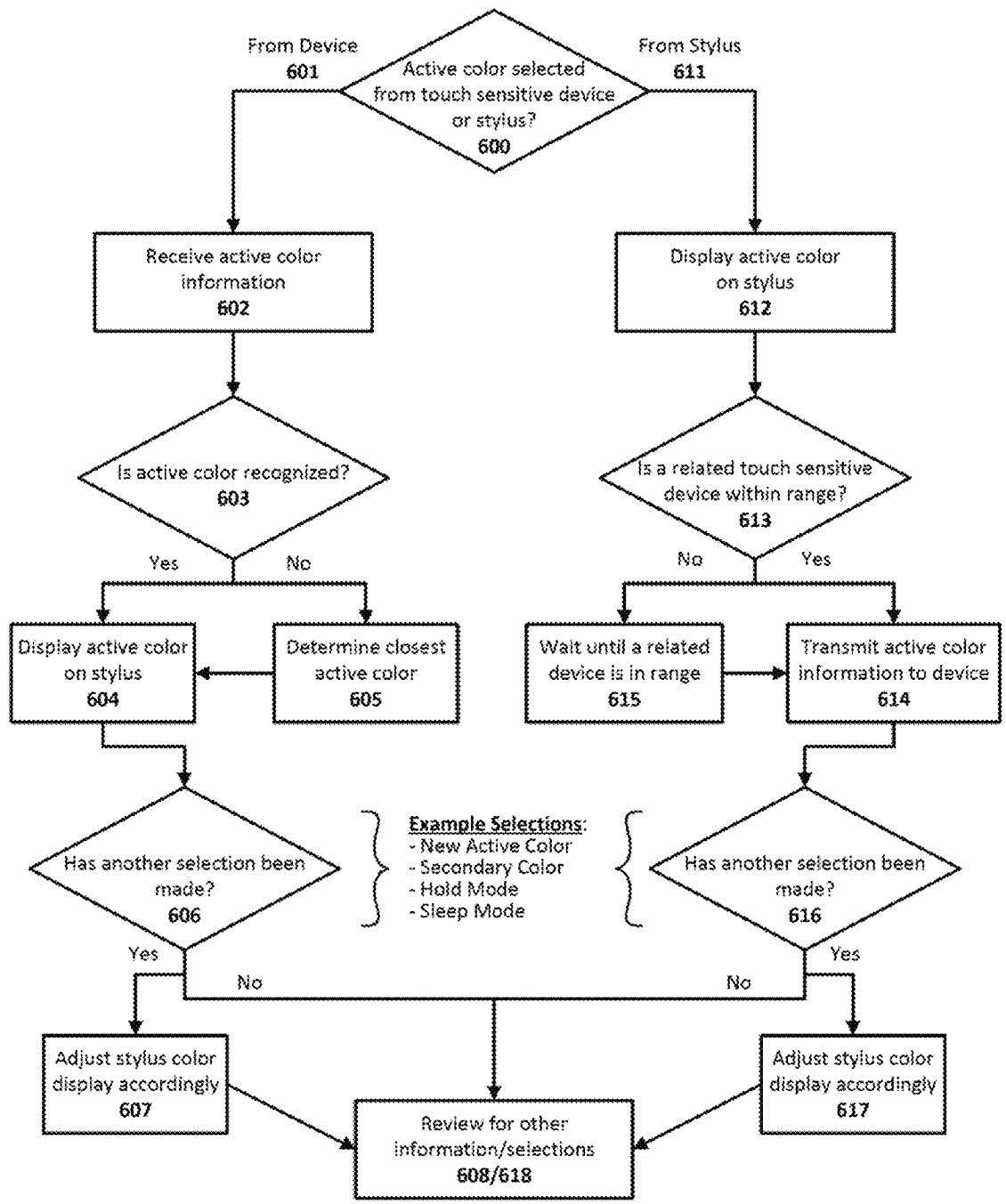
FIG. 6 illustrates a method for displaying active colors on a stylus, in accordance with one or more embodiments of the present invention.

FIG. 6 illustrates a method for displaying active colors on a stylus, in accordance with one or more embodiments of the present invention. The method for displaying active colors on a stylus can be performed whether the active color is selected from the touch sensitive device or from the stylus itself. Therefore, in this example, it is first determined whether the active color is selected from the touch sensitive device or the stylus 600. The left side of the flow chart (601-608) shows an example technique for displaying an active color on a stylus when the active color is selected from a related touch sensitive device. The right side of the flow chart (611-618) shows an example technique for displaying an active color on a stylus when the active color is selected from the stylus itself.

As can be seen, when the active color is selected from a touch sensitive device 601 (e.g., see FIGS. 5a-c), the active color information is received 602 by the stylus after a user selects 601 an active color from the related device. If the active color information indicates an active color that is recognized 603 by the stylus if that color can be displayed), then the stylus will display the active color on the stylus 604. In some instances, if the color is not recognized, the stylus may be configured to determine 605 the closest color possible and then will display 604 that color on the stylus.

After the active color has been displayed on the stylus, the stylus determines if another selection has been made 606, which may include a new active color selection, a secondary color selection, a hold mode selection, or a sleep mode selection, just to name a few. The selections may be made from the related device or the stylus itself. For example and as previously described, if the stylus includes a side button (e.g., see FIGS. 5a-c), then the depression of that side button may cause a selection, such as the selection of a secondary color. When the secondary color is selected, that color becomes the active color and is displayed on the stylus to indicate to a user that the side button has been depressed and any writing/drawing/etc will be done in the secondary color. If a selection is made, then the stylus color display adjusts accordingly 607. After the display is adjusted 607 or if no selection is made, then the stylus continues to review for other information or selections 608.

When the active color is selected from the stylus itself 611 (e.g., see FIGS. 4a-b), the selected active color is displayed on the stylus 612 after a user selects the active color from the stylus 611. It is then determined whether the stylus is within a certain range of a related touch sensitive device 613. If it is, then the stylus will transmit the active color information to that related device 614 so that the device can adjust the active color in the current application according to the active color selected. If the stylus is not within range of a related device, the stylus may wait until it is within range of a related device 615 and then transmit the selected active color information 614. While out of range of any related touch sensitive device, the stylus may be configured to save power (e.g., if it uses battery power) by waiting to transmit the active color information until the stylus is within range of a related device or turning off the color display on the stylus, for example.

After the active color information has been transmitted to a related, device, the stylus determines if another selection has been made 616 as previously described. If a selection is made, then the stylus color display adjusts accordingly 617. After the display is adjusted 617 or if no selection is made, then the stylus continues to review for other information or selections 618.

Numerous variations and embodiments will be apparent in light of this disclosure. One example embodiment of the present invention provides a stylus including a communication module configured to communicate with a touch sensitive device, and a color indication module configured to indicate an active color on the stylus (the active color being associated with a color displayable on the touch sensitive device in response to the stylus interacting with a touch sensitive surface of that device). In this example embodiment, the color indication module provides 360 degrees of visibility of the active color. In some cases, the color indication module includes a transparent housing and a multi-color light-emitting diode (LED). In some cases, the stylus is used as one of a writing tool, a drawing tool, and a highlighting tool. In some cases, the communication module is configured to receive active color selection information from the device using a wireless communication link. In some cases, the color indication module is located at the top of the stylus, the tip of the stylus, and/or around the body of the stylus. In some cases, the color indication module comprises a colored display. In some cases, the stylus includes a rechargeable battery that recharges using the touch sensitive device. In some cases, the stylus includes a control feature for allowing stylus-based user input, wherein the communication module is configured to transmit the stylus-based user input to the touch sensitive device. In some such cases, the control feature is at least one of a button, a rotating mechanism, a switch, a sliding control bar, and a scroll wheel. In some cases, the stylus is configured to enter a sleep mode when the touch sensitive device is in a sleep mode. In some cases, the color indication module is configured to blink the active color when a hold mode is activated. In some cases, settings of the stylus are user-configurable.

Another example embodiment of the present invention provides a stylus including a color selection module (configured to allow the selection of an active color from the stylus), a communication module (configured to transmit active color information to a touch sensitive device), and a color indication module (configured to visually indicate the selected active color on the stylus). In some cases, the color selection module comprises a hardware control feature. In some such cases, the hardware control feature is at least one of a button, a rotating mechanism, a switch, a sliding control bar, and a scroll wheel. In some cases, the color indication module provides 360 degrees of visibility of the active color.

Another example embodiment of the present invention provides a system including an electronic device having a display for displaying content to a user and a stylus detection surface for allowing user input. The system also includes a stylus configured to interact with the electronic device (via the stylus detection surface) and having a color indication module configured to visually indicate an active color on the stylus (the active color being associated with a color displayable on the touch sensitive device in response to the stylus interacting with the stylus detection surface). In this example embodiment, the color indication module visually indicates the active color so that the active color can be seen at any stylus orientation. In some cases, the stylus includes a communication module for exchanging active color information with the electronic device. In some cases, the color indication module is deployed at the top of the stylus and includes a multi-color light-emitting diode (LED). In some cases, active color selection is achieved by manipulating a stylus control feature.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A stylus comprising:
an elongated body portion including a stylus tip on an end of the elongated body portion, the stylus tip configured to interact with a touch sensitive surface of a touch sensitive device;
a communication circuit configured to communicate with the touch sensitive device, wherein the communication circuit is configured to at least one of transmit active color selection information to the touch sensitive device and receive active color selection information from the touch sensitive device using a communication link established using the communication circuit;
a color indication circuit configured to display an active color on the stylus, the active color being associated with a color input for the touch sensitive device in response to the stylus tip interacting with the touch sensitive surface of the device; and
a rotatable button mechanism on an end of the elongated body portion opposite the stylus tip and configured to twist relative to the elongated body portion to allow a user to select the active color from the stylus, the rotatable button mechanism further configured to depress in a direction along the elongated body portion to provide input to the touch sensitive device, wherein the color indication circuit is configured to display the active color from the rotatable button mechanism, such that the rotatable button mechanism provides 360 degrees of visibility of the active color;
wherein the active color can be switched between a primary color and a secondary color in response to manipulation of a stylus hardware control feature, and wherein the rotatable button mechanism is further configured to simultaneously display the primary and secondary colors.

2. The stylus of claim 1 wherein the rotatable button mechanism comprises a transparent housing and a multi-color light-emitting diode (LED).

3. The stylus of claim 1 wherein the stylus is used as one of a writing tool, a drawing tool, and a highlighting tool.

4. The stylus of claim 1 wherein the communication link is a wireless communication link.

5. The stylus of claim 1 wherein the rotatable button mechanism is the stylus hardware control feature that is configured to switch the active color between the primary color and the secondary color.

6. The stylus of claim 5 wherein the active color can be switched between the primary color and the secondary color by depressing the rotatable button mechanism.

7. The stylus of claim 1 further comprising a rechargeable battery that recharges using the touch sensitive device.

8. The stylus of claim 1 further comprising a button located on the elongated body portion of the stylus and configured to provide input to the touch sensitive device.

9. The stylus of claim 1 wherein the stylus hardware control feature is a button located on the elongated body portion of the stylus.

10. The stylus of claim 1 wherein the stylus is configured to enter a sleep mode when the touch sensitive device is in a sleep mode, such that the active color is no longer indicated by the color indication circuit when the stylus enters the sleep mode.

11. The stylus of claim 1 wherein the color indication circuit is configured to blink the active color when a hold mode is activated, the hold mode preventing input from the stylus tip via interaction with the touch sensitive surface of the touch sensitive device.

12. The stylus of claim 1 wherein the touch sensitive device is one of a tablet computer, a smart phone, and an eReader device.

13. A stylus comprising:
a communication circuit configured to wirelessly communicate with a touch sensitive device, an application on the touch sensitive device allowing color input and having a primary and secondary color associated with the application, wherein the communication circuit is configured to at least one of transmit and receive information identifying the primary and secondary colors;
a rotatable button mechanism on an end of an elongated body portion of the stylus opposite a stylus tip, the rotatable button mechanism configured to twist relative to the elongated body portion to allow a user to select at least one of the primary and secondary colors associated with the application from the stylus, the rotatable button mechanism further configured to depress in a direction along the elongated body portion to allow a user to switch between the primary and secondary colors; and
a color indication circuit configured to simultaneously visually indicate the primary and secondary colors via the rotatable button mechanism.

14. The stylus of claim 13 wherein the selection of at least one of the primary and secondary colors using the rotatable mechanism is transmitted to the touch sensitive device via the communication circuit.

15. The stylus of claim 13 wherein the primary and secondary colors are configured to be received from the touch sensitive device via the communication circuit.

16. The stylus of claim 13 wherein the rotatable button mechanism provides 360 degrees of visibility of the primary and secondary colors.

17. A system comprising:
an electronic device having a display for displaying content to a user and a stylus detection surface for allowing user input; and
a stylus having an elongated body portion including a stylus tip on an end of the elongated body portion, the stylus tip configured to interact with the electronic device via the stylus detection surface, the stylus including
a rotatable button mechanism on an end of the elongated body portion opposite the stylus tip and configured to twist relative to the elongated body portion to allow a user to select a desired active color from the stylus, the rotatable button mechanism further configured to depress in a direction along the elongated body portion to provide input to the electronic device, and
a color indication circuit configured to visually indicate the active color via the rotatable button mechanism such that the active color is visible at any stylus orientation, the active color being associated with a color displayable on the electronic device in response to the stylus tip interacting with the stylus detection surface,
wherein the color indication circuit is further configured to simultaneously visually indicate, via the rotatable button mechanism, a secondary color with the active color, and wherein the active color and secondary color can be switched in response to user input.

18. The system of claim 17, wherein the stylus includes a communication circuit for exchanging active color information with the electronic device.

19. The system of claim 17 wherein the user input for switching the active color and the secondary color includes depressing the rotatable button mechanism.

20. The system of claim 17 wherein the user input for switching the active color and the secondary color includes depressing a button located on the elongated body portion of the stylus.

* * * * *